J. L. DRAKE.
MILK PAIL AND STRAINER.
No. 66,814. Patented July 16, 1867.
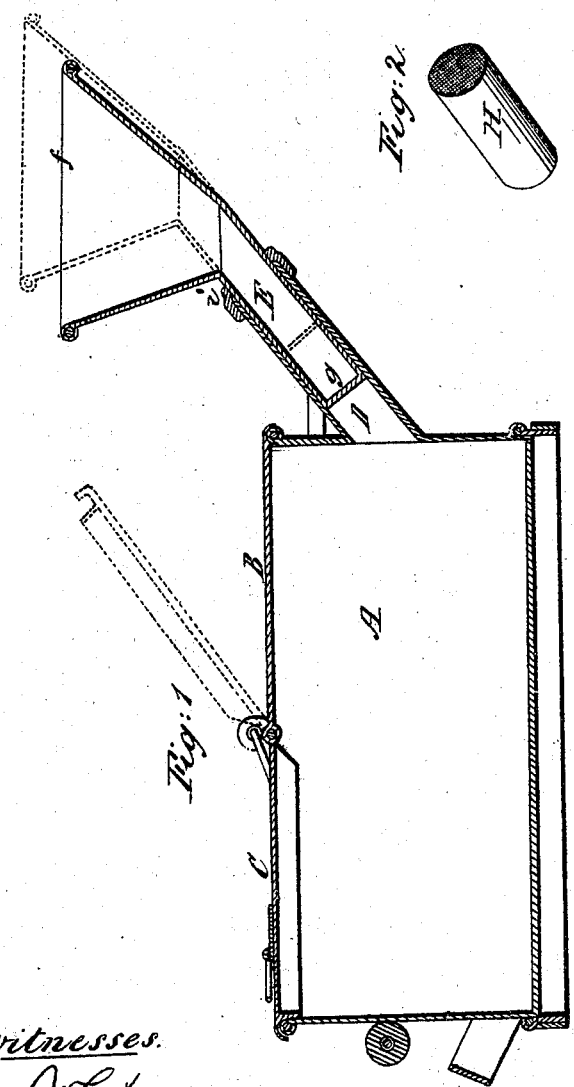

United States Patent Office.

JAMES L. DRAKE, OF BOSTON, NEW YORK.

Letters Patent No. 66,814, dated July 16, 1867.

IMPROVED MILK-PAIL AND STRAINER.

The Schedule referred to in these Letters Patent and making part of the same.

TO ALL WHOM IT MAY CONCERN:

Be it known that I, JAMES L. DRAKE, of Boston, in the county of Erie, and State of New York, have invented a new and useful Combined Stool, Milk-Pail, and Strainer; and I do hereby declare that the following is a full and exact description thereof, reference being had to the accompanying drawings, making part of this specification, in which—

Figure 1 is a central vertical section, and

Figure 2 a perspective view of the cap-strainer detached.

My invention consists of a pail so constructed as to serve both for a milk-receptacle and a stool, and provided with a duct or tube extending therefrom, which has a removable funnel-shaped mouth portion that is capable of adjustment to a greater or less height and distance from the pail, as required; said mouth portion being provided with a strainer through which the milk passes before entering the pail.

In the drawings, A represents a pail, preferably of oval form, made either of metal or wood provided with a cover, which may conveniently be made with one-half, B, permanently closed, and the other, C, hinged, so as to turn up, as shown in red lines, and of sufficient stiffness to hold the weight of the milker. From one end of the pail extends a spout or tube, D, inclining upward, into which fits, so as to slide therein, a removable portion, E, having a funnel-shaped mouth, $f$. The end of the tubular part of E is provided with a suitable strainer, $g$. A rubber ring, $i$, fits on the end of the tube D, partially overlapping the end so as to render the joint tight, and by clamping the tube E retains it in place at whatever position in which it may be adjusted, as clearly shown in fig. 1. If desired, the pail may be used as an ordinary strainer by simply providing a cylindrical strainer-cap, H, fig. 2, which is slipped on the end of the tube D.

The advantages of my improvement are as follows: It forms a convenient seat for the milker, dispensing with the use of an extra stool. It prevents the pail from being overturned and the milk spilled, as the pail is not required to be set under the cow. The mouth $f$ may be adjusted higher or lower, at a greater or less distance from the pail, as the size of the animal or other circumstance may require, as shown in red lines, the elastic ring $i$ holding it in whatever position in which it may be placed. The mouth $f$ being adjusted immediately under the cow's bag the milk strikes the inclined sides thereof, which, with the proximity of the funnel mouth to the teats, prevents any spattering of the milk on the clothes.

One of the greatest advantages, however, of my improvement is the protection it affords against dirt, &c., getting into the milk, protecting it equally from the drippings from the animal during rainy weather, as from the dirt and dust that would accidentally fall or be blown into the pail were it of the ordinary construction.

What I claim as my invention, and desire to secure by Letters Patent, is—

The utensil herein described, consisting of the closed vessel A, hinged cover C, adjustable and removable funnel $f$ and strainer $g$, constructed and operating substantially as and for the purpose set forth.

I also claim, in combination therewith, the elastic ring $i$ on the joint of tubes D and E, arranged and operating in the manner specified.

In witness whereof I have hereunto signed my name in the presence of two subscribing witnesses.

J. L. DRAKE.

Witnesses:
 JAY HYATT,
 J. FRASER.